United States Patent
Tan et al.

(10) Patent No.: US 7,940,919 B2
(45) Date of Patent: May 10, 2011

(54) PERIODIC AND AUTOMATIC TELEPHONE REDIALLING SYSTEM AND METHOD

(75) Inventors: Ai-Kian Tan, Penang (MY); Shih-Hsiung Weng, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 1382 days.

(21) Appl. No.: 11/080,069

(22) Filed: Mar. 14, 2005

(65) Prior Publication Data

US 2006/0203995 A1    Sep. 14, 2006

(51) Int. Cl.
*H04M 1/00* (2006.01)

(52) U.S. Cl. ......... 379/357.04; 379/209.01; 379/265.09; 379/355.02; 379/355.05

(58) Field of Classification Search ............. 379/357.04, 379/201.01, 209.01, 265.09, 355.01
See application file for complete search history.

(56) References Cited

U.S. PATENT DOCUMENTS

| | | | | |
|---|---|---|---|---|
| 5,311,574 A * | 5/1994 | Livanos | ............ | 379/209.01 |
| 5,956,395 A * | 9/1999 | Song | ............ | 379/209.01 |
| 6,493,447 B1 * | 12/2002 | Goss et al. | ............ | 379/265.09 |
| 6,804,509 B1 * | 10/2004 | Okon et al. | ............ | 455/414.1 |
| 2003/0002642 A1 * | 1/2003 | Jorasch et al. | ............ | 379/201.01 |

* cited by examiner

*Primary Examiner* — Simon Sing
*Assistant Examiner* — Ibraham Sharifzada
(74) *Attorney, Agent, or Firm* — Peter F. Corless; Steven M. Jensen; Edwards Angell Palmer & Dodge LLP

(57) ABSTRACT

A periodic and automatic telephone redialling system and method applicable to a dial-type communication device is proposed to provide a periodic and automatic telephone redialling procedure on phone numbers previously dialled by a user but failed to get through to the receiver. The advantages of this periodic and automatic telephone redialling system and method are that the user does not have to activate the redialling procedure manually, and the redialling procedure can be performed periodically for one or more phone numbers.

18 Claims, 2 Drawing Sheets

| Number | Receiver | Redial Period | Countdown time |
|--------|----------|---------------|----------------|
| 1 | Agnus | 15 Min. | 12 Min |
| 2 | Betty | 5 Min | 0 Min |
| 3 | 6045751885 | 20 Min | 8 Min |
| 4 | Sally | 5 Min | 5 Min |
| 5 | Faye | 25 Min | 20 Min |

FIG. 2

PERIODIC AND AUTOMATIC TELEPHONE REDIALLING SYSTEM AND METHOD

FIELD OF THE INVENTION

The present invention relates to a telephone communication technology, and more particularly, to a periodic and automatic telephone redialling system and method, applicable to a dial-type communication device, such as a wired telephone device, a wireless mobile phone device, or a Voice over IP (VoIP) phone device etc., such that a periodic and automatic redialling procedure is performed for phone numbers dialled by a user but failed to get through every user-defined period until the calls successfully get through.

BACKGROUND OF THE INVENTION

A dial-type communication device, such as a wired telephone device, a wireless mobile phone device, or a Voice over IP (VoIP) phone device etc., enables a user to connect via dialling to a remote communication device, allowing voice conversations to take place between users at both side. Usually, dial-type communication device has a redial function that stores the number previously dialled by the user but did not connect to the other side successfully in a memory, so that the user only needs to press a certain redial button to enable the redial function to automatically redials the previously unsuccessful phone number.

However, one of the disadvantage of the conventional redial function is that it requires the user to manually activate the redialling procedure, that is, the user has to press the redial button by hand for activation. This is not very convenient and the user may forget to make the phone call again when he/she is busy.

Additionally, most conventional redial function only remembers one telephone number, i.e., the most recent one dialled. This obviously does not satisfy a situation of several unsuccessful phone numbers which the user requires redialling.

SUMMARY OF THE INVENTION

In light of the above drawbacks, the primary objectives of the present invention is to provide a periodic and automatic telephone redialling method and system that can simultaneously perform automatic redialling for one or more telephone numbers until all the phone calls get through successfully.

The periodic and automatic telephone redialling system is applicable to a dial-type communication device, such as a wired telephone device, a wireless mobile phone device, or a Voice over IP (VoIP) phone device etc., such that a periodic and automatic redialling procedure is performed for phone numbers dialled by a user but failed to get through every user-defined period until the phone calls successfully get through.

Compared to the conventional technology, the present invention has the advantages of that the user does not have to activate the redialling procedure manually, and the redialling procedure can be performed periodically for one or more phone numbers until they are connected successfully.

BRIEF DESCRIPTION OF THE DRAWINGS

FIG. 2 shows an example of data stored in a waiting queue of the periodic and automatic telephone redial system and method of the present invention.

PREFERRED EMBODIMENTS OF THE INVENTION

Figure 1:
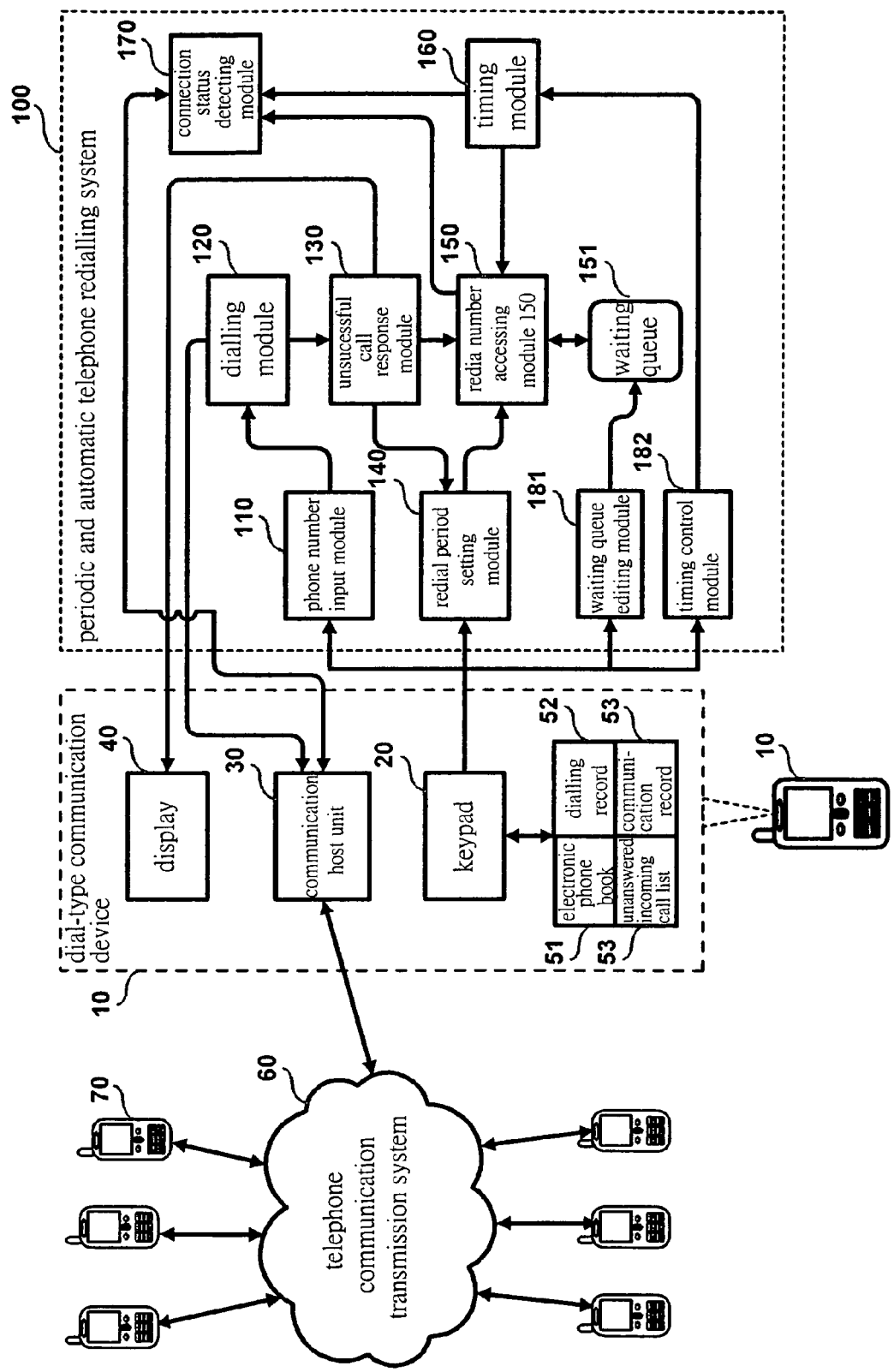
FIG. 1 shows a system framework schematics of the object-oriented component model of the periodic and automatic telephone redialling system according to the present invention.

Embodiments of the periodic and automatic telephone redialling system and method according to the present invention will be described below in conjunction with the accompanying drawings.

FIG. 1 shows a schematic of the periodic and automatic telephone redialling system of the present invention (as indicated by a portion 100 enclosed by a dashed line). As shown in the FIG. 1, the periodic and automatic telephone redialling system 100 can be applied and associated with a dial-type communication device 10, such as a wired telephone device, a wireless mobile phone device, or a Voice over IP (VoIP) phone device etc. The dial-type communication device 10 comprises a keypad 20, a communication host unit 30, and a display 40. This dial-type communication device 10 is able to communicate with communication devices 70 of other users via a telephone communication transmission system 60, such as a Public Switched Telephone Network (PSTN), the Internet, or a wireless base station. Since the system framework of this dial-type communication device 10 is conventional, so it will not be further described in detail.

Additionally, the dial-type communication device 10 can selectively comprise such as an electronic phone book 51, a dialling record 52, unanswered incoming call list 53, and a call list 54. The electronic phone book 51 can store a plurality of phone numbers and their related information entered by the user. The dialling record 52 stores those phone numbers dialled by the user and their related information. The unanswered incoming call list 53 stores phone numbers of incoming calls unanswered by the user. The communication list 54 stores phone numbers of calls made or received by the user and related information.

The periodic and automatic telephone redialling system 100 can perform a redialling procedure for all phone calls made by the user but failed to get through every user-defined period until they get through successfully.

The basic structure of the periodic and automatic telephone redialling system 100 comprises: (a) a phone number input module 110; (b) a dialling module 120; (c) an unsuccessful call response module 130; (d) a redial period setting module 140; (e) a redial number accessing module 150; (f) a timing module 160; (g) a connection status detecting module 170; and selectively includes a waiting queue editing module 181 and a timing control module 182.

The phone number input module 110 is used to allow a phone number the user wishes to dial to be inputted via the keypad 20 or from the electronic phone book 51, the dial record 52, the unanswered incoming call list 53 or the communication list 54. Upon receiving the phone number, the phone number input module 110 then sends it to the dialling module 120.

The dialling module 120 performs a dialling procedure upon receiving the phone number sent by the phone number input module 110; if the dialling successfully gets through, the user can make a conversation through this dialling communication system 10; else, if the dialling is not successful (for example when no one answers the phone or the line is busy), the unsuccessful call response module 130 will then perform a predefined response procedure.

In response to the unsuccessful dialling procedure performed by the dialling module 120, the unsuccessful call response module 130 for example displays a dialogue on the display 40 such that the user can select from a continuous redial mode, a periodic and automatic redial mode or a cancel mode. If the user selects the continuous redial mode, the dialling module 120 performs the redialling procedure continuously until the call gets through; else if the user selects the periodic and automatic redial mode, the periodic and automatic telephone redialling system 100 of the present invention performs an periodic and automatic redialling procedure for the phone number of the unsuccessful call.

Under the periodic and automatic redial mode, the redial period setting module 140 can for example display a dialogue on the display 40 so that the user can set up a parameter of redial period for this particular unsuccessful call. For example, if the user set the parameter of redial period to 20 minutes, the periodic and automatic telephone redialling system 100 of the present invention performs the redialling procedure on the phone number of the unsuccessful call every 20 minutes until the call gets through (or the user cancels it).

Under the periodic and automatic redial mode, the redial number accessing module 150 stores the phone number of the unsuccessful call and the redial period parameter defined by the user through the redial period setting module 140 in the waiting queue 151.

This waiting queue 151 can store one or more phone numbers previously dialled but unsuccessful in getting through, user-defined redial period and related information. FIG. 2 is an example of data shown on the display 40 that are stored in the waiting queue 151, where it shows the name of the receivers to which phone calls were made but did not get through, the corresponding user defined redial periods and countdown time to redial. Additionally, a priority attribute can be assigned to each phone number according to the order in which they are stored in the waiting queue 151.

The timing module 160 times the user-defined redial period corresponding to respective phone number stored in the waiting queue 151 of the redial number accessing module 150. Every time a redial period is reached, the timing module 160 sends out a connection detecting enabling signal to the connection status detecting module 170 and the redial number accessing module 150, such that the redial number accessing module 150 accesses the phone number from the waiting queue 151 for which the redial period is reached (if there are more than one phone number reach their redial period simultaneously, then the phone numbers are accessed in order according to their priority attributes), and the connection status detecting module 170 detects whether a connection has been established between the communication device to which the accessed phone number belongs and the telephone communication transmission system 60.

The connection status detecting module 170 detects whether a connection has been established between the communication device to which the phone number in the waiting queue 151 that currently reaches its redial period belongs and the telephone communication transmission system 60. For example, the connection status detecting module 170 detects whether a Dual Tone Multi-Frequency (DTMF) signal is returned by the communication device to which the phone number belongs. If so, then the connection status detecting module 170 sends out a redial enabling signal.

The waiting queue editing module 181 allows the user to edit the redial periods of the phone numbers or delete a certain phone number currently stored therein and via keypad 20 and the display 40.

The timing control module 182 allows the user to pause or resume after pausing the current timing procedure of the timing module 160 via the keypad 20. This function allows the user to pause the timing procedure of the timing module 160 while he/she is resting or dining and resume when he/she is ready to take a phone call.

In practice, the user can input a phone number he/she wishes to dial via the keypad 20 or select from the electronic phone book 51, the dial record 52, the unanswered incoming call list 53 or the communication list 54. The phone number input module 110 then sends the phone number to be dialled to the dialling module 120 to perform a dialling procedure; if the dialling is successful, then the user can have a conversation through the communication host unit 30 in the dial-type communication device 10 with the other side; or else if the dialling does not get through (unanswered or busy line), then the unsuccessful call response module 130 performs a predetermined response procedure. In the response procedure, the unsuccessful call response module 130 for example first displays a dialogue on the display 40 to allow the user to select from a continuous redial mode or a periodic and automatic redial mode or a cancel mode. If the user selects the continuous redial mode, the dialling module 120 performs the redialling procedure continuously until the call gets through.

If the user selects the periodic and automatic redial mode, then the redial period setting module 140 first displays a dialogue on the display 40 for the user to set up a redial period for this unsuccessful phone call, and then the redial number accessing module 150 stores this redial period parameter set by the user along with the corresponding phone number to the waiting queue 151. Each of the phone number stored in the waiting queue 151 is designated with a priority value (priority attribute) according to the timing order each of them is stored.

After that, the timing module 160 then starts counting down the redial period for the corresponding unsuccessful phone call. A connection detection enabling signal is sent to the connection status detecting module 170 and the redial number accessing module 150 each time a redial period is reached, such that the redial number accessing module 150 accesses the phone number from the waiting queue 151 for which the redial period is reached (if there are more than one phone number reach their redial period simultaneously, then the phone numbers are accessed in order of their priority attributes), and the connection status detecting module 170 detects whether a connection has been established between the communication device to which the accessed phone number belongs and the telephone communication transmission system 60, i.e. the connection status detecting module 170 detects whether a Dual Tone Multi-Frequency (DTMF) signal is returned by the communication device to which the phone number belongs. If so, then the connection status detecting module 170 sends out a redial enabling signal.

In practical implementation, the periodic and automatic telephone redialling system 100 of the present invention can for example display a dialogue in response to the redial enabling signal for the user to select whether to redial immediately, wait for a while before redialling, or cancel the redial process. If the user selects to redial immediately, the redial number accessing module 150 sends the phone number accessed to the dialling module 120 to allow the redialling of the phone number. If the user does not respond, the periodic and automatic telephone redialling system 100 of the present invention can wait for the user's response or return to the periodic timing procedure.

If after redialling the call still does not get through, the periodic and automatic telephone redialling system 100 of the present invention will then perform the periodic and automatic redialling procedure according to the redial period until the call successfully gets through (or until the user cancels it).

In summary, the present invention provides a new periodic and automatic telephone redialling system and method that can be associated with a dial-type communication device to allow a redialling procedure to be performed automatically and periodically every user-defined redial period on phone numbers previously dialled but failed to get through. Compared to the prior art, the present invention has the advantages of that the user does not have to activate the redialling procedure manually, and the redialling procedure can be performed periodically for one or more phone numbers until they are connected successfully.

The embodiments described above are only to illustrate aspects of the present invention; it should not be construed as to limit the scope of the present invention in any way.

While the invention has been described in detail with reference to specific embodiments thereof, it will be apparent in the art that various changes and modifications can be made, and equivalents employed, without departing from the scope of the claims.

What is claimed is:

1. A periodic and automatic telephone redialling method applicable to a dial-type communication device to provide automatic and periodic telephone redialling, the method comprising:
   receiving a phone number inputted by a user;
   performing a dialling procedure for this phone number;
   if the dialling procedure is unsuccessful, allowing the user to set up a redial period for the unsuccessfully dialled phone number prior to switching to a periodic and automatic redial mode; and
   performing a countdown procedure on the redial period that corresponds to the unsuccessfully dialled phone number, and, each time the redial period is reached, performing a connection status detecting procedure, by detecting whether a Dual Tone Multi-Frequency (DTMF) signal is returned by a communication device to which the phone number belongs, for the unsuccessful phone number in order to determine whether the communication device is connected to the dial-type communication device, wherein, if so, then a redial procedure is performed, and, if the call is still unsuccessful, then the redial procedure is performed every redial period.

2. The method claimed in claim 1, wherein the dial-type communication device is a wired telephone device.

3. The method claimed in claim 1, wherein the dial-type communication device is a mobile phone device.

4. The method claimed in claim 1, wherein the dial-type communication device is a network phone device.

5. A periodic and automatic telephone redialling system applicable to a dial-type communication device to provide automatic and periodic telephone redialling, the system comprising:
   a phone number input module to allow a user to enter a phone number to be dialled;
   a dialling module for performing a dialling procedure on the phone number received by the phone number input module;
   an unsuccessful call response module allowing the user to select a continuous redial mode or a periodic and automatic redial mode in response to the dialling procedure performed by the dialling module being unsuccessful;
   a redial period setting module for the user to set up a redial period parameter for the unsuccessfully dialled phone number under the periodic and automatic redial mode;
   a redial number accessing module for storing the redial period parameter set by the user along with the corresponding unsuccessfully dialled phone number in a waiting queue under the periodic and automatic redial mode;
   a timing module for performing a countdown procedure on the redial period of at least one unsuccessfully dialled phone number stored in the waiting queue and sending out a redial enabling signal whenever the redial period corresponding to one of the unsuccessfully dialled phone numbers is reached; and
   a connection status detecting module for detecting whether the dial-type communication device is connected to a communication device to which the phone number of which the redial period is reached belongs, by detecting whether a Dual Tone Multi-Frequency (DTMF) signal is returned by the communication device, wherein, if connection is detected, then a redial enabling signal is sent out;
   wherein the redial enabling signal enables the redial number accessing module to access the phone number of which the redial period is reached from the waiting queue and sends the phone number to the dialling module to perform the dialling procedure for this phone number, thus completing the redialling, wherein, if the call still fails to get through, the redialling is performed every redial period.

6. The system claimed in claim 5, wherein the dial-type communication device is a wired telephone device.

7. The system as claimed in claim 5, wherein the dial-type communication device is a mobile phone device.

8. The system as claimed in claim 5, wherein the dial-type communication device is a network phone device.

9. The system as claimed in claim 5, wherein the redial number accessing module designates a priority attribute to each phone number stored in the waiting queue according to the order in which the phone numbers are stored.

10. The system as claimed in claim 5 further comprising:
    a waiting queue editing module for allowing the user to edit the redial period for each phone number stored in the waiting queue or delete the phone number.

11. The system as claimed in claim 5 further comprising:
    a timing control module for allowing the user to pause or resume after pausing the countdown procedure of the timing module.

12. A periodic and automatic telephone redialling system applicable to a dial-type communication device to provide a periodic and automatic telephone redialling procedure on phone numbers previously dialled by a user that were unsuccessfully connected, the system comprising:
    a redial period setting module for the user to set up a redial period parameter for the phone number previously dialled but unsuccessfully connected;
    a redial number accessing module for storing the redial period parameter set by the user along with the corresponding unsuccessfully connected phone number in a waiting queue;
    a timing module for performing a countdown procedure on the redial period of at least one unsuccessfully connected phone number stored in the waiting queue and sending out a redial enabling signal whenever the redial period corresponding to one of the unsuccessfully connected phone numbers is reached; and
    a connection status detecting module for detecting whether the dial-type communication device is connected to a communication device to which the phone number of which the redial period is reached belongs, by detecting whether a Dual Tone Multi-Frequency (DTMF) signal is returned by the communication device, wherein, if connection is detected, then a redial enabling signal is sent out;

wherein the redial enabling signal enables the redial number accessing module to access the phone number of which the redial period is reached from the waiting queue and the redialling procedure on the accessed phone number is performed, wherein, if the call still fails to get through, the redialling procedure is performed every redial period.

13. The system claimed in claim 12, wherein the dial-type communication device is a wired telephone device.

14. The system as claimed in claim 12, wherein the dial-type communication device is a mobile phone device.

15. The system as claimed in claim 12, wherein the dial-type communication device is a network phone device.

16. The system as claimed in claim 12, wherein the redial number accessing module designates a priority attribute to each phone number stored in the waiting queue according to the order in which the phone numbers are stored.

17. The system as claimed in claim 12 further comprising:
a waiting queue editing module for allowing the user to edit the redial period for each phone number stored in the waiting queue or delete the phone number.

18. The system as claimed in claim 12 further comprising:
a timing control module for allowing the user to pause or resume after pausing the countdown procedure of the timing module.

* * * * *